United States Patent [19]
Enei et al.

[11] 3,900,368
[45] Aug. 19, 1975

[54] FERMENTATIVE PRODUCTION OF RIBOFLAVINE

[75] Inventors: Hitoshi Enei, Zushi; Katsuaki Sato; Yasuo Anzai, both of Kawasaki; Hiroshi Okada, Tokyo, all of Japan

[73] Assignee: Ajinomoto Co., Inc., Tokyo, Japan

[22] Filed: Oct. 15, 1973

[21] Appl. No.: 406,319

[30] Foreign Application Priority Data
Oct. 26, 1972 Japan.............................. 47-107504

[52] U.S. Cl. ............ 195/96; 195/DIG. 10; 195/112
[51] Int. Cl............................................. C12d 5/04
[58] Field of Search....... 195/28 R, 96, 112, DIG. 9, 195/410

[56] References Cited
UNITED STATES PATENTS
3,433,707    3/1969    Matsubayashi et al. .......... 195/28 R

*Primary Examiner*—Lionel M. Shapiro
*Assistant Examiner*—R. B. Penland
*Attorney, Agent, or Firm*—Hans Berman; Kurt Kelman

[57] ABSTRACT

Riboflavine (Vitamine $B_2$) is found in recoverable amounts in culture broths of artificially induced mutants of *Bacillus subtilis* although the parent strain does not produce detectable amounts of the vitamin.

5 Claims, No Drawings

FERMENTATIVE PRODUCTION OF RIBOFLAVINE

This invention relates to the fermentative production of riboflavine (Vitamin $B_2$).

It is known that riboflavine can be found in the culture broths of certain wild strains of microorganisms such as *Ashbya gossypii* (Patent No. 2,876,169), *Eremothecium ashbyii*, *Candida flaveri*, *Mycocandida riboflavina*, and *Clostridium autobutylicum*. No riboflavine producing mutants of parent microorganisms unable to produce the vitamin by fermentation were known heretofore.

It has now been found that riboflavine in economically significant amounts is also produced by artificially induced mutants of *Bacillus subtilis* while the parent strain does not produce detectable amounts of the vitamin. Suitable mutants are found when the parent is exposed to any one of the conventional mutagenic agents such as ionizing radiation (ultraviolet light, X-rays, gamma rays) or chemical agents (sodium nitrite, nitrosoguanidine, diethyl sulfate). Exposure to an aqueous solution of 250 $\gamma$/ml nitrosoguanidine at 30°C for 30 minutes is typical of the mutant inducing procedures which lead to the microorganisms employed in the method of this invention.

The mutants produced may be screened directly for their ability of producing riboflavine, but it has been found that there is a good correlation between the resistance of a mutant to purine base analogs and its ability of producing riboflavine in relatively high yields. Among the mutants resisting purine base analogs, those requiring a purine base for growth have been found best.

Purine base analogs which have been used successfully for screening include 8-azaxanthine, 8-azaguanine, 8-azaadenine, 6-chloropurine, 6-mercaptopurine, 6-methylaminopurine, 8-azaxanthosine, 8-azapurine, and 2-thioxanthine. Capability of a mutant of *B.subtilis* of growing on a culture medium containing 100 $\gamma$/ml 8-azaguanine, 8-azaxanthine, etc. is indicative of riboflavine producing properties. Among the strains so selected, highest yields of riboflavine were obtained with the adenine requiring strains *B.subtilis* FERM-P 1657 and FERM-P 2292 which are available from the Fermentation Research Institute, Agency of Industrial Science and Technology, Ministry of International Trade and Industry, No. 1-8-5, Inagehigashi, Chiba-shi, Chiba-ken, Japan.

*B.subtilis* FERM-P 1657 is capable of growth on a culture medium containing 150 $\gamma$/ml 8-azaguanine and also on a medium containing 1000 $\gamma$/ml purine and 500 $\gamma$/ml 8-azaxanthine. *B.subtilis* FERM-P 2292 resists the simultaneous inhibiting effect of 1000 $\gamma$/ml purine, 100 $\gamma$/ml 8-azaguanidine, and 200 $\gamma$/ml 8-azaxanthine.

All the riboflavine producing mutants of *B.subtilis* are cultured aerobically on conventional media containing assimilable sources of carbon and nitrogen, sources of inorganic ions needed for the growth of the microorganisms, and minor organic nutrients required or at least beneficial for their growth.

The two preferred strains mentioned above are capable of metabolizing carbohydrates (glucose, sucrose, starch, starch hydrolyzate, molasses), organic acids (acetic acid, citric acid, fumaric acid), and alcohols (ethanol, sorbitol) as carbon sources. Suitable nitrogen sources include ammonia, nitrates, and urea. Growth is enhanced, and the yield of riboflavine is improved by small amounts of pepton, bouillon, soy protein hydrolyzate, corn steep liquor, yeast extract, casein hydrolyzate, RNA from yeast cells, and like materials as is well known in itself.

A pH value between 5 and 9 needs to be maintained by means of aqueous ammonia, calcium carbonate, alkali metal hydroxide, urea, organic or inorganic acids according to the nature of the carbon source in the culture medium, and nitrogenous pH adjusting agents may simultaneously serve as nitrogen sources. The riboflavine concentration in the broth reaches its maximum usually within two to seven days if the fermentation is carried out at 25° to 37°C.

Riboflavine may be recovered from the culture broth by reducing it to an insoluble product which may be isolated and again converted to riboflavine by means of oxidizing agents.

The following Examples are further illustrative of this invention.

EXAMPLE 1

Cells of individual mutant strains produced from *B.subtilis* by contact with nitrosoguanidine and isolated in a conventional manner were suspended in water, and 0.1 ml of each cell suspension containing approximately $10^7$ cells was spread on a plate carrying a culture medium which contained 2.5 g/dl glucose, 0.5 g/dl ammonium chloride, 0.4 g/dl $KH_2PO_4$, 0.02 g/dl $MgSO_4.7H_2O$, 0.05 g/dl sodium citrate, 0.1 g/dl L-glutamic acid, 0.2 mg/dl $Fe^{++}$, 0.2 mg/dl $Mn^{++}$, 10 mg/dl adenine, certain amounts of purine and its analogues and 2 g/dl agar (pH 7.0). The cultures were stored at 34°C for 24 hours and those showing good growth were used in the production of riboflavine, as illustrated by Example 2.

EXAMPLE 2

*B.subtilis* FERM-P 1657 was cultured for 8 hours at 34°C in a medium containing 1 g/dl yeast extract, 1.0 g/dl peptone, and 0.5 g/dl NaCl.

An aqueous fermentation medium was prepared to contain, per deciliter, 8 g glucose, 1.5 g ammonium nitrate, 20 mg $KH_2PO_4$, 40 mg $MgSO_4.7H_2O$, 0.2 mg $Fe^{++}$, 0.2 mg $Mn^{++}$, 0.2 g $CaCO_3$, 4 ml soy protein hydrolyzate, 0.1 g RNA, and 0.7 g L-glutamic acid, was adjusted to pH 7.5.

20 ml Batches of the medium were placed in 500 ml flasks, sterilized with steam, and separately sterilized calcium carbonate was added in an amount of 0.5 g/dl. Each sterilized medium was inoculated with 2 ml of the previously prepared culture of *B.subtilis*, and the flasks were shaken at 31°C for 44 hours. The combined fermentation broths then contained 0.56 g/l riboflavine.

The microbial cells were removed by centrifuging from 10 liters of broth, and 20 g sodium dithionite was added to the clear supernatant. A crystalline precipitate formed and was recovered by centrifuging. The crystals, which weighed 1.8 g, were suspended in 500 ml hot 1 N acetic acid. Saturated potassium permanganate solution was added in small batches to the hot suspension until further addition of permanganate would have produced a permanent pink color. Upon cooling, riboflavine crystallized and was recovered by filtering. The crude riboflavine weighing 800 mg was recrystallized from water, and 600 mg pure crystalline riboflavine was obtained.

The product was identified by paper chromatography, infrared spectrum, and elementary analysis.

The same procedure was employed in producing riboflavine by means of *B.subtilis* FERM-P 2292. The riboflavine concentration in the cultured broth prior to work-up was 0.61 g/l.

What is claimed is:

1. A method of producing riboflavine which comprises culturing a riboflavine-producing, artificially induced mutant of a parent microorganism of the genus *Bacillus* on an aqueous fermentation medium including assimilable sources of carbon and nitrogen, inorganic ions, and minor organic nutrients required for the growth of said mutant until riboflavine accumulates in said medium; and recovering the accumulated riboflavine from said medium, said parent microorganism being unable to produce riboflavine when cultured on said medium.

2. A method as set forth in claim 1, wherein said mutant is capable of growing on said fermentation medium in the presence of 100 mg/l of at least one member of the group consisting of purine, 8-azaguanine, and 8-azaxanthine.

3. A method as set forth in claim 2, wherein said mutant requires adenine for growth.

4. A method as set forth in claim 3, wherein said microorganism is *Bacillus subtilis*.

5. A method as set forth in claim 1, wherein said mutant is *Bacillus subtilis* FERM-P 1657 or *Bacillus subtilis* FERM-P 2292.

* * * * *